(12) United States Patent
Xue

(10) Patent No.: US 7,876,569 B2
(45) Date of Patent: Jan. 25, 2011

(54) MOUNTING APPARATUS FOR MOTHERBOARD

(75) Inventor: Yuan Xue, Shenzhen (CN)

(73) Assignees: Hong Fu Jin Precision Industry (ShenZhen) Co., Ltd., Shenzhen, Guangdong Province (CN); Hon Hai Precision Industry Co., Ltd, Tu-Cheng, Taipei Hsien (TW)

( * ) Notice: Subject to any disclaimer, the term of this patent is extended or adjusted under 35 U.S.C. 154(b) by 428 days.

(21) Appl. No.: 12/106,338

(22) Filed: Apr. 21, 2008

(65) Prior Publication Data

US 2009/0231817 A1 Sep. 17, 2009

(30) Foreign Application Priority Data

Mar. 13, 2008 (CN) .................... 2008 2 0300345 U

(51) Int. Cl.
*H05K 7/12* (2006.01)
(52) U.S. Cl. .................. 361/759; 361/747; 361/801; 361/807; 361/732
(58) Field of Classification Search .................. 361/742, 361/758, 770, 804, 807, 809, 747, 740, 726, 361/759, 801, 732
See application file for complete search history.

(56) References Cited

U.S. PATENT DOCUMENTS

| | | | |
|---|---|---|---|
| 5,973,926 A | 10/1999 | Sacherman et al. | |
| 6,089,878 A | 7/2000 | Meng | |
| 6,259,032 B1 * | 7/2001 | Fernandez | 174/138 E |
| 6,362,978 B1 * | 3/2002 | Boe | 361/825 |
| 6,695,629 B1 * | 2/2004 | Mayer | 439/92 |
| 6,781,055 B2 * | 8/2004 | Chen | 174/535 |
| 6,798,669 B1 * | 9/2004 | Hsu | 361/801 |
| 7,004,764 B2 * | 2/2006 | Boudreau et al. | 439/74 |
| 7,212,400 B2 | 5/2007 | Fan et al. | |
| 7,430,129 B1 * | 9/2008 | Peng | 361/807 |

* cited by examiner

*Primary Examiner*—Dameon E Levi
(74) *Attorney, Agent, or Firm*—Frank R. Niranjan

(57) ABSTRACT

A mounting apparatus for a motherboard includes a chassis and a mounting assembly for securing the motherboard in the chassis. The mounting assembly includes a pivot member pivotally attached to the chassis and a limiting member securely attached to the chassis. The pivot member is rotatable from a released position disengaging from the motherboard to a final position resisting against the motherboard for preventing the motherboard sliding from a secured position to a detachable position. The limiting member includes a resilient arm. A resisting piece extends from the resilient arm and engages with the pivot member to prevent the pivot member rotating from the final position to the released position.

19 Claims, 4 Drawing Sheets

MOUNTING APPARATUS FOR MOTHERBOARD

BACKGROUND

1. Field of the Invention

The present invention relates to mounting apparatuses, and particularly to a mounting apparatus that readily attaches a motherboard to a computer chassis.

2. Description of Related Art

Conventionally, a motherboard is mounted to a computer chassis with fasteners, such as screws or bolts. However, when installing or removing the motherboard, a tool such as a screwdriver or a wrench is usually required, and tightening or removing the fasteners is laborious and time-consuming.

An improved mounting apparatus for the motherboard with fewer fasteners is provided. The mounting apparatus includes a supporting plate disposed in the chassis and a plurality of standoffs mounted on the chassis. The motherboard comprises a plurality of through holes, a plurality of apertures, and a fixing hole. The supporting plate comprises a first clip, a second clip, and a screw hole. Each through hole includes a circular hole and a slot communicating with the circular hole. Each standoff includes a head, a base, and a neck connecting the head and the base. Each clip includes a shoulder and a catch. The bases of the standoffs and the shoulders of the clips support the motherboard. The necks of the standoffs engage in the slots of the through holes and the catches of the clips engage in the apertures. A stud extends through the fixing hole and engages in the screw hole to secure the motherboard in the chassis. However, when installing or removing the motherboard, it is still very inconvenient to tighten or remove the stud.

Accordingly, what is needed is a mounting apparatus for readily securing a motherboard in a computer chassis.

SUMMARY

A mounting apparatus for a motherboard includes a chassis and a mounting assembly for securing the motherboard in the chassis. The mounting assembly includes a pivot member pivotally attached to the chassis and a limiting member securely attached to the chassis. The pivot member is rotatable from a released position disengaged from the motherboard to a final position resisting against the motherboard for preventing the motherboard sliding from a secured position to a detachable position. The limiting member includes a resilient arm. A resisting piece extends from the resilient arm and engages with the pivot member to prevent the pivot member rotating from the final position to the released position.

Other advantages and novel features of the present invention will become more apparent from the following detailed description of preferred embodiment when taken in conjunction with the accompanying drawings, in which:

DETAILED DESCRIPTION OF THE EMBODIMENT

Figure 1:
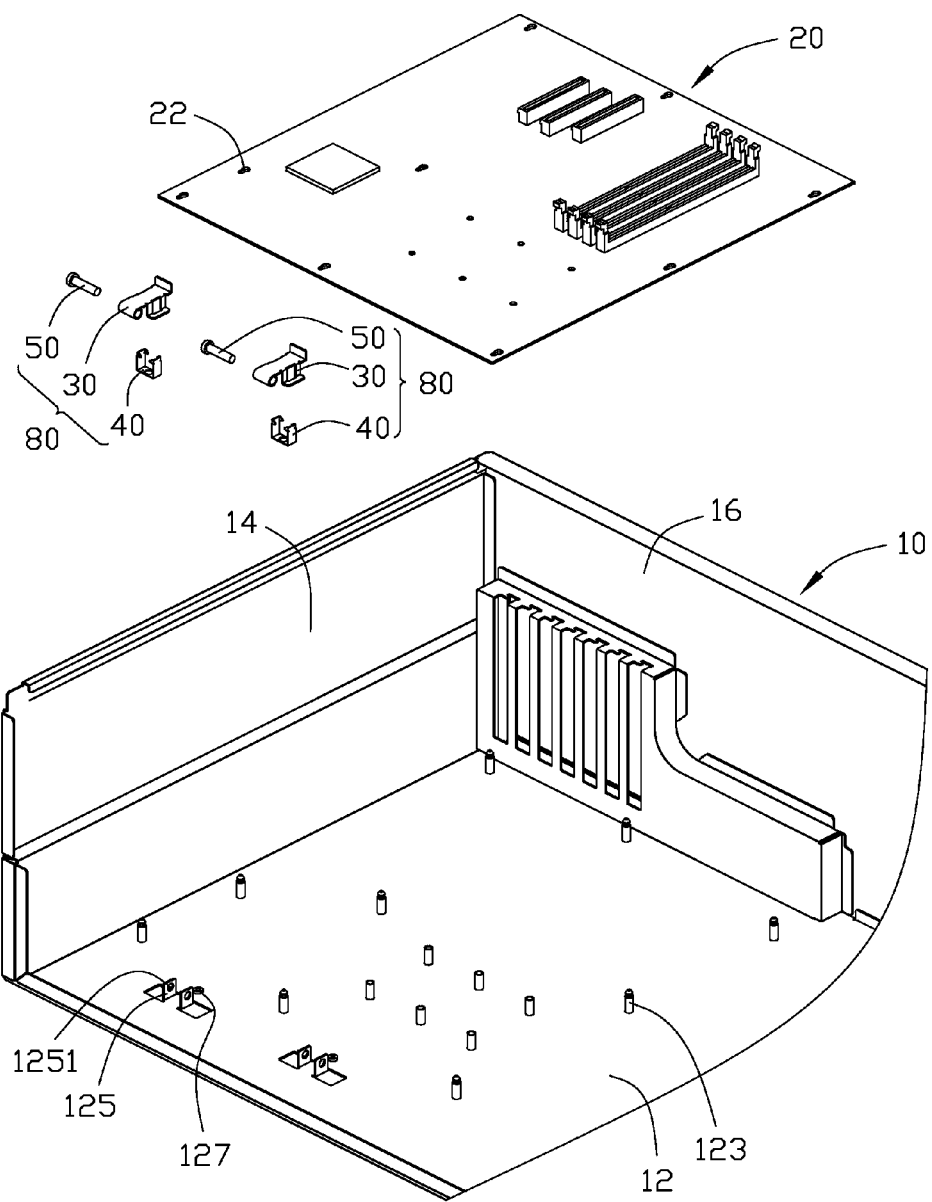
FIG. 1 is an exploded, isometric view of a mounting apparatus for a motherboard of a preferred embodiment of the present invention, the mounting apparatus including a chassis, and a pair of mounting assemblies, each mounting assembly including a pivot member, a limiting member, and a pivot pole.

Referring to FIG. 1, a mounting apparatus for mounting a motherboard 20 in a computer chassis 10 includes a pair of mounting assemblies 80. The motherboard 20 defines a plurality of securing holes 22 therein. Each of the securing holes 22 has a small section and a big section. Each of the mounting assemblies 80 has a pivot member 30, a resilient limiting member 40, and a pivot pole 50.

The chassis 10 includes a bottom panel 12, a side panel 14 perpendicular to the bottom panel 12, and a rear panel 16 perpendicular to the bottom panel 12 and the side panel 14. A plurality of standoffs 123 protrudes upwardly and perpendicularly from the bottom panel 12. Each of the standoffs 123 has a column extending upwardly from the bottom panel 12, a cap at a top end thereof, and a concave neck connecting the column and the cap. The diameter of the neck is less than that of the column and the cap. The diameter of the cap is less than that of the big section of the securing hole 22, but greater than that of the small section of the securing hole 22. The diameter of the small section of the securing hole 22 is not less than that of the neck of the standoff 123. The diameter of the column of the standoff 1 23 is greater than that of the big section of the securing hole 22. Two pairs of upright pieces 125 extend perpendicularly and upwardly from the bottom panel 12. Each of the upright pieces 125 has a pivot hole 1251. Two fixing posts 127 protrude upwardly from the bottom panel 12 for mounting the limiting members 40 of the mounting assemblies 80. The upright pieces 125 and the fixing posts 127 are located at an area adjacent a front edge of the bottom panel 12.

Figure 2:
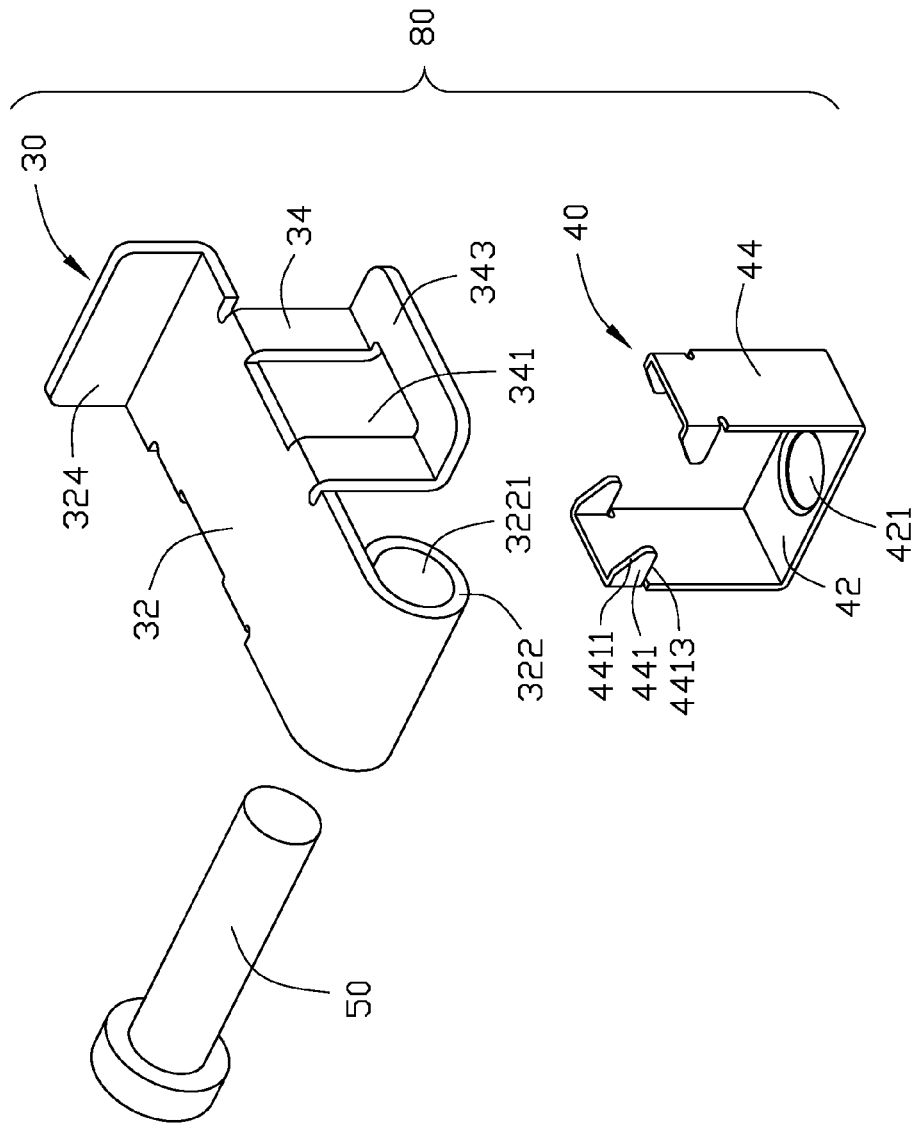
FIG. 2 is an isometric view of one of the mounting assemblies of the mounting apparatus of FIG. 1.

Referring to FIG. 2, the pivot member 30 includes a pivot panel 32, and a pair of L-shaped supporting legs 34 extending down from two opposite sides of the pivot panel 32. Each of the supporting legs 34 includes an opening 341 defined therein, and a resisting flange 343 perpendicular to the opening 341 at a bottom thereof. A supporting piece 343 extends perpendicularly from a bottom edge of the leg 34. The supporting piece 343 is parallel to the pivot panel 32. A front edge of the pivot panel 32 is rolled to form a cylinder 322, thereby defining a column-shaped pivot hole 3221 for receiving the pivot pole 50 therein. A resisting flange 324 extends perpendicularly and upwardly from a rear edge of the pivot panel 32.

Each of the limiting members 40 includes a bottom piece 42, and a pair of resilient arms 44 extending upwardly and perpendicularly from two opposite sides of the bottom piece 42. A circular hole 421 is defined in the bottom piece 42 corresponding to the fixing post 127 of the chassis 10. A pair of parallel resisting pieces 441 extends from two top ends of each of the resilient arms 44 respectively. A plane of each of the resisting pieces 441 is perpendicular to that of the bottom piece 42. Each of the resisting pieces 441 includes a slanting guide edge 4411 at a side edge thereof and a resisting edge 4413 at a bottom edge thereof.

Figure 3:
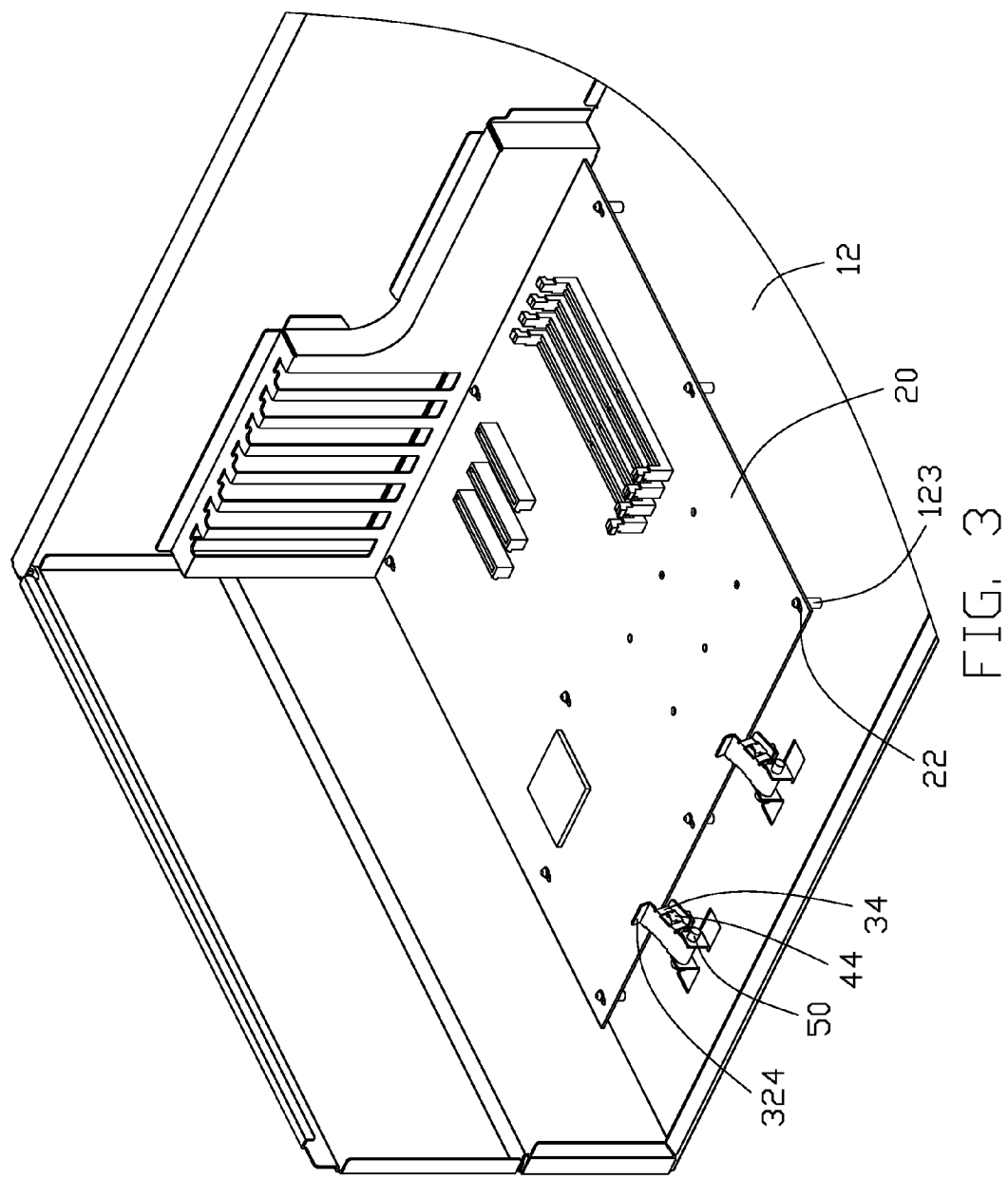
FIG. 3 is a pre-assembled view of FIG. 1, showing the pivot members at a released position.
Figure 4:
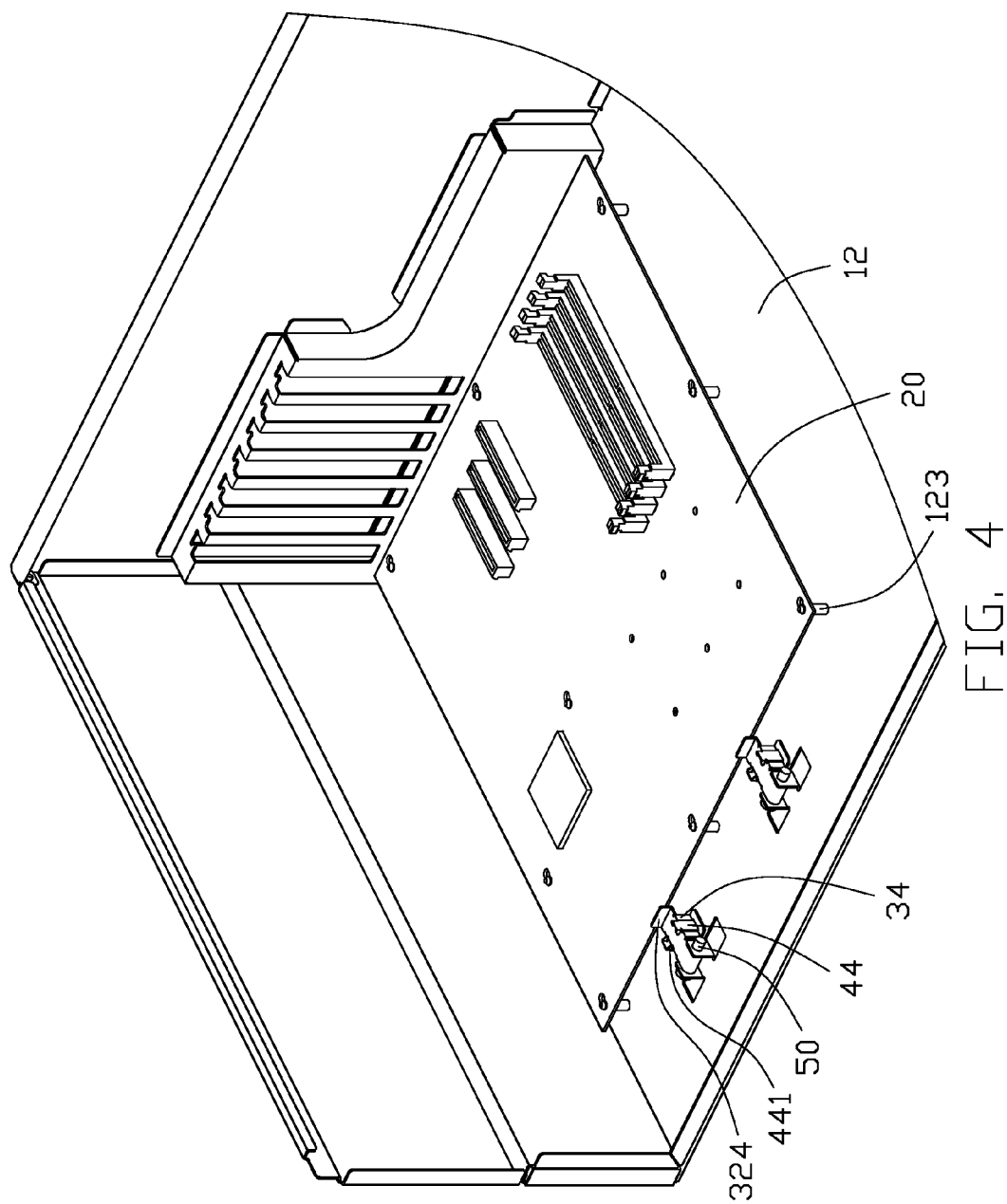
FIG. 4 is an isometric assembled view of FIG. 1, showing the pivot members rotated to a final position to secure the motherboard.

Referring also to FIGS. 3-4, in assembling the mounting assemblies 80 to the chassis 10. The fixing posts 127 extend through the circular holes 421 of the limiting members 40 of the mounting assemblies 80 respectively. The limiting members 40 are then respectively riveted on the bottom panel 12 of the chassis 10. The cylinders 322 of the pivot members 30 are sandwiched between the paired upright pieces 125 respectively. Each of the pivot poles 50 extends through the pivot holes 1251 of the corresponding paired upright pieces 125 and the cylinder 322 sandwiched between the corresponding paired upright pieces 125. Thus, the pivot members 30 are pivotally attached in the chassis 10. The resilient arms 44 of the limiting members 40 extend though corresponding openings 341 of the pivot members 30. The pivot panel 32 of each of the pivot members 30 is resisted on the guide edges 4411 of the resisting pieces 441 of the resilient arms 44 of corresponding limiting member 40.

In assembly of the motherboard 20, the caps of the standoffs 123 respectively extend through the big sections of the securing holes 22 of the motherboard 20 until the columns thereof abut on the motherboard 20. At this time, the necks of the standoffs 123 are positioned in the corresponding securing holes 22 of the motherboard 20, so that the motherboard 20 is slidable along a direction towards and then perpendicular to the rear panel 16 of the chassis 10 until the necks of the standoffs 123 engages in the small sections of the securing holes 22 of the motherboard 20. Then the pivot panel 32 of each of the pivot members 30 is rotated down to press the guiding edges 4411 of the resisting pieces 441 and outwardly deform the resilient arms 44 of the corresponding limiting member 40, so as to pass across the resisting pieces 441. When the pivot panels 32 pass across the resisting pieces 441, the pivot panels 32 are rotated to a final position where the resilient arms 44 rebound and the resisting edges 4413 of the resisting pieces 441 resist against the pivot panels 32, thereby preventing the pivot panel 32 rotating reversely. At this time, the resisting flanges 324 of the pivot members 30 resist against an edge of motherboard 20 to block the motherboard 20 sliding relative the bottom panel 12 of the chassis 10, and the motherboard 20 is therefore secured in the chassis 10.

In disassembly, the resilient arms 44 of each of the limiting members 40 are deformed outwards for allowing the pivot members 30 disengaging from the resisting edges 4413 of the resisting pieces 441, so that the pivot members 30 are rotated upwards to disengage the resisting flanges 324 from the edge of the motherboard 20. Then the motherboard 20 is slid again along a direction away from and perpendicularly to rear panel 16. When the standoffs 123 respectively reach the big section of the securing holes 22 of the motherboard 20, the motherboard 20 can be thus pulled up from the bottom panel 12 of the chassis 10.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A mounting apparatus for a motherboard comprising:
a chassis; and
a mounting assembly attached to the chassis for preventing the motherboard from sliding from a secured position where the motherboard is not movable in a direction away from the chassis to a detachable position where the motherboard is movable in the direction away from the chassis, the mounting assembly comprising:
a pivot member pivotally attached to the chassis and rotatable from a released position disengaging from the motherboard to a final position resisting against the motherboard; and
a limiting member attached on the chassis, the limiting member comprising a resilient arm and a resisting piece extending from a free end of the resilient arm, the resisting piece clasping the pivot member at the final position.

2. The mounting apparatus as described in claim 1, wherein the pivot member comprises a supporting leg spaced from the chassis at the released position, resisting on the chassis at the final position.

3. The mounting apparatus as described in claim 2, wherein the pivot member comprises a pivot panel of which one end resists against the motherboard at the final position, the supporting leg extends from one side of the pivot panel.

4. The mounting apparatus as described in claim 3, wherein a cylinder extends from another end of the pivot panel, a pivot pole attached in the chassis extends through the cylinder for pivotally attaching the pivot member.

5. The mounting apparatus as described in claim 4, wherein a pair of upright pieces extends from the chassis, each of the upright pieces defines a pivot hole therein for mounting the pivot pole, the cylinder of the pivot member is sandwiched between the upright pieces, the pivot pole extends through the pivot holes of the upright pieces and cylinder of the pivot member.

6. The mounting apparatus as described in claim 1, wherein the resisting piece comprises a guide edge for facilitating the pivot member to rotate from the released position to the final position and a resisting edge for locking engagement with the pivot member at the final position.

7. The mounting apparatus as described in claim 1, wherein the chassis comprises a bottom panel, and the pivot member is rotatable about an axis parallel to the bottom panel.

8. The mounting apparatus as described in claim 7, wherein the limiting member comprises a bottom piece secured on the bottom panel, the resilient arm extends perpendicularly and upward from one side of the bottom piece.

9. A mounting assembly comprising:
a motherboard with a mounting hole defined therein, the mounting hole comprising a first section and a second section bigger than the first section;
a chassis with a standoff attached thereon engaging in the first section of the mounting hole of the motherboard;
a pivot member pivotally attached to the chassis, the pivot member comprising a pivot panel and a resisting flange extending substantially perpendicularly from a distal edge of the pivot panel, the resisting flange being rotatable to resist against the motherboard for preventing standoffs of the chassis from reaching the second section of the mounting hole of the motherboard; and
a limiting member engaging with the pivot panel of the pivot member for preventing the pivot member from rotating to disengaging from the motherboard.

10. The mounting assembly as described in claim 9, wherein the pivot member comprises a supporting leg resisting on the chassis.

11. The mounting assembly as described in claim 10, wherein the resisting flange of the pivot member extends perpendicularly and upward from one end edge of the pivot panel, a cylinder extends from another end edge of the pivot panel, a pivot pole attached to the chassis extends through the cylinder for pivotally attaching the pivot member.

12. The mounting assembly as described in claim 11, wherein a pair of upright pieces extends from the chassis, each of the upright pieces defines a pivot hole therein for mounting the pivot pole, the cylinder of the pivot member is sandwiched between the upright pieces, the pivot pole extends through the pivot holes of the upright pieces and cylinder of the pivot member.

13. The mounting assembly as described in claim 9, wherein the limiting member comprises a resilient arm, a resisting piece extending from the resilient arm for engaging with the pivot panel of the pivot member.

14. The mounting assembly as described in claim 13, wherein the resisting piece comprises a guide edge for facilitating the pivot member from rotating from a released position to a final position and a resisting edge for locking engagement with the pivot panel of pivot member at the final position.

15. The mounting assembly as described in claim 9, wherein the limiting member comprises a bottom piece secured on the chassis, the resilient arm extends perpendicularly and upward from one side of the bottom piece.

16. The mounting assembly as described in claim 9, wherein the pivot member is rotatable about an axis parallel to the edge of the motherboard.

17. A mounting assembly comprising:
  a motherboard having a plurality of through holes;
  a chassis with a plurality of standoffs arranged thereon, the standoffs extending through the respective through holes and cooperatively supporting the motherboard thereon, the motherboard being suspended over the chassis, and moveable relative to the chassis in a given direction with the standoffs being slidable relative to the motherboard in the respective through holes;
  a pivot member pivotably attached to the chassis, the pivot member comprising a pivot shaft, a pivot panel rotatable relative to the pivot shaft and a resisting flange extending from the pivot panel, the resisting flange resisting against an edge of the motherboard for preventing the motherboard from moving in the given direction toward the pivot member; and
  a limiting member mounted on the chassis for engaging with the pivot panel of the pivot member for preventing the pivot member from rotating along a first direction thereby disengaging from the motherboard, the limiting member comprising a resilient arm and a resisting piece extending from the resilient arm, the resilient arm configured for engaging with the pivot panel and preventing the pivot member from rotating along the first direction thereby disengaging from the motherboard.

18. The mounting assembly as described in claim 17, wherein the pivot member comprises a supporting leg extending from one side of the pivot panel and resisting on the chassis for preventing the pivot member from rotating along a second direction reverse to the first direction thereby disengaging from the motherboard.

19. The mounting assembly as described in claim 17, wherein the resisting piece comprises a guide edge for facilitating the pivot member rotating to a final position and a resisting edge for locking engagement with the pivot panel of pivot member at the final position.

* * * * *